US009605613B2

(12) United States Patent
Sarlashkar et al.

(10) Patent No.: US 9,605,613 B2
(45) Date of Patent: Mar. 28, 2017

(54) COORDINATED CONTROL OF ENGINE AND AFTER TREATMENT SYSTEMS

(71) Applicant: Southwest Research Institute, San Antonio, TX (US)

(72) Inventors: Jayant V. Sarlashkar, San Antonio, TX (US); Ryan C. Roecker, Fair Oaks Ranch, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 511 days.

(21) Appl. No.: 14/276,495

(22) Filed: May 13, 2014

(65) Prior Publication Data

US 2015/0330322 A1 Nov. 19, 2015

(51) Int. Cl.

| F01N 3/00 | (2006.01) |
|---|---|
| F02D 41/02 | (2006.01) |
| F02D 41/00 | (2006.01) |
| F01N 11/00 | (2006.01) |
| F01N 3/20 | (2006.01) |
| F02D 41/14 | (2006.01) |

(52) U.S. Cl.
CPC ......... *F02D 41/0235* (2013.01); *F01N 3/208* (2013.01); *F01N 11/00* (2013.01); *F02D 41/0002* (2013.01); *F02D 41/1461* (2013.01); *F02D 41/1462* (2013.01); *F01N 2900/1616* (2013.01); *F01N 2900/1622* (2013.01); *F02D 41/1454* (2013.01); *Y02T 10/24* (2013.01); *Y02T 10/42* (2013.01)

(58) Field of Classification Search
USPC .. 60/274, 276, 285, 286, 295, 297, 301, 303
See application file for complete search history.

(56) References Cited

U.S. PATENT DOCUMENTS

| 8,108,123 | B2 | 1/2012 | Sarlashkar et al. | |
|---|---|---|---|---|
| 8,453,434 | B2* | 6/2013 | Yacoub | F01N 3/208 60/274 |
| 8,671,665 | B2* | 3/2014 | Yasui | F01N 3/208 60/285 |
| 8,919,099 | B2* | 12/2014 | Sun | F01N 3/2073 60/274 |
| 2011/0262329 | A1 | 10/2011 | Ofoli et al. | |
| 2013/0054122 | A1 | 2/2013 | Aoyagi | |
| 2013/0318949 | A1* | 12/2013 | Matsunaga | F01N 3/10 60/286 |
| 2014/0013725 | A1* | 1/2014 | Sun | F01N 3/208 60/274 |
| 2015/0176512 | A1* | 6/2015 | Smith | F02D 41/0235 60/274 |

OTHER PUBLICATIONS

K. Rajkumar, et al "Impact of Oxygen Enriched Air Intake on the Exhaust of a Single Cylinder Diesel Engine", American Journal of Environmental Sciences 7 (2): pp. 136-140, 2011.

* cited by examiner

*Primary Examiner* — Binh Q Tran
(74) *Attorney, Agent, or Firm* — Grossman, Tucker et al

(57) ABSTRACT

The present disclosure relates to a method and apparatus to reduce fuel consumption while remaining in NOx compliance by simultaneous and coordinated control of the engine and the selective catalytic reduction (SCR) system. More particularly, the present disclosure identifies methods and apparatus to increase NOx output within a diesel engine to optimize the performance of a given SCR system while simultaneously reducing fuel consumption at a selected and targeted intake oxygen concentration.

9 Claims, 2 Drawing Sheets

COORDINATED CONTROL OF ENGINE AND AFTER TREATMENT SYSTEMS

FIELD OF THE INVENTION

The present invention relates to a method and apparatus to reduce fuel consumption while remaining in NOx compliance by simultaneous and coordinated control of the engine and the selective catalytic reduction (SCR) system. More particularly, the present invention identifies methods to increase NOx output within a diesel engine to optimize the performance of a given SCR system while simultaneously reducing fuel consumption at a selected and targeted intake oxygen concentration.

BACKGROUND

Internal combustion engines such as those found in cars and trucks may produce combustion byproducts and/or products of incomplete combustion which may be in the engine exhaust and emitted into the environment. Per emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides (NOx). Accordingly, diesel engines may include selective catalytic reduction (SCR) systems in order to seek reduction in nitrogen oxide concentrations. Improving performance of such systems remains an ongoing area of research and development.

More specifically, for diesel engines, the main pollutants of concern are nitrogen oxides (NOx) and particulate matter (PM). To reduce NOx it is common to employ NOx reduction systems, including SCR systems to convert NOx (NO and $NO_2$ in some fraction) to $N_2$ and other compounds. SCR systems utilize a reductant, typically ammonia, and an SCR catalyst to convert the NOx. Due to the undesirability of handling pure ammonia, many systems utilize an alternate compound such as urea that vaporizes and decomposes to ammonia before entering the SCR catalyst.

SUMMARY

The present disclosure is directed at a method and apparatus for controlling a selective catalytic reduction (SCR) system of an internal combustion engine including control of engine intake oxygen concentration to achieve a desired or targeted NOx output (NOx*) with an associated adjustment of fuel consumption. The method, which can be carried out by the apparatus, includes identifying for a selected engine the relationship between fuel consumption and NOx output as a function of intake oxygen concentration, wherein the selected engine includes a SCR system containing a SCR catalyst. This may then be followed by determining for the SCR system associated with the selected engine the current amount of reductant stored in the SCR catalyst divided by the reductant storage capacity of said SCR catalyst, wherein $$a = \frac{\text{Amount of Reductant Stored in } SCR \text{ Catalyst}}{\text{Reductant Storage Capacity of } SCR \text{ Catalyst}}$$

One may then determine a targeted level of NOx output for the engine (NOx*), wherein the value of NOx* increases with increasing amount of reductant stored on the SCR catalyst. This is then followed by selecting a targeted intake oxygen concentration ($f_1$*) for the selected engine to achieve the value of NOx* and operating said engine at the value of $f_1$* and adjusting the engine fuel consumption for said value of $f_1$*.

The present disclosure is also again directed at a method or apparatus for controlling a selective catalytic reduction (SCR) system of an internal combustion engine and intake oxygen concentration comprising initially identifying for a selected engine the relationship between fuel consumption and NOx output as a function of intake oxygen concentration ($f_1$), wherein the selected engine includes a SCR system containing a SCR catalyst. This may then be followed by determining for the SCR system associated with the selected engine the current amount of reductant stored in said SCR catalyst divided by the reductant storage capacity of said SCR catalyst, wherein $$a = \frac{\text{Amount of Reductant Stored in } SCR \text{ Catalyst}}{\text{Reductant Storage Capacity of } SCR \text{ Catalyst}}$$

This is then followed by identifying a first targeted value for a identified as ($a^*_1$) and identifying a second and relatively lower targeted value for a ($a^*_E$). One may then modulate the injected amount of reductant to increase the value of a towards said first targeted value of a ($a^*_1$) while also simultaneously modulating the production of NOx by controlling the intake oxygen concentration to drive the value of a towards said second target value of a ($a^*_E$).

DETAILED DESCRIPTION

As alluded to above, most SCR systems generate ammonia to reduce NOx present in the exhaust gas generated by the internal combustion engine. However, while many systems are reported in the art that rely upon approaches to reduce actual NOx output, what appears overlooked, among other things, is that for a given engine system, it would be of advantage to configure engine operation to reduce fuel consumption while simultaneously optimizing the performance of the SCR system to remain within a particular NOx compliance number or range. Accordingly, this disclosure relates generally to exhaust gas after-treatment systems for internal combustion engines. More particularly, a method, system and apparatus are disclosed for optimizing the performance of the selective catalytic reduction catalyst (SCR) for a selected diesel engine configuration to reduce fuel consumption where NOx output may actually be increased at some higher intake oxygen concentration.

Figure 1:
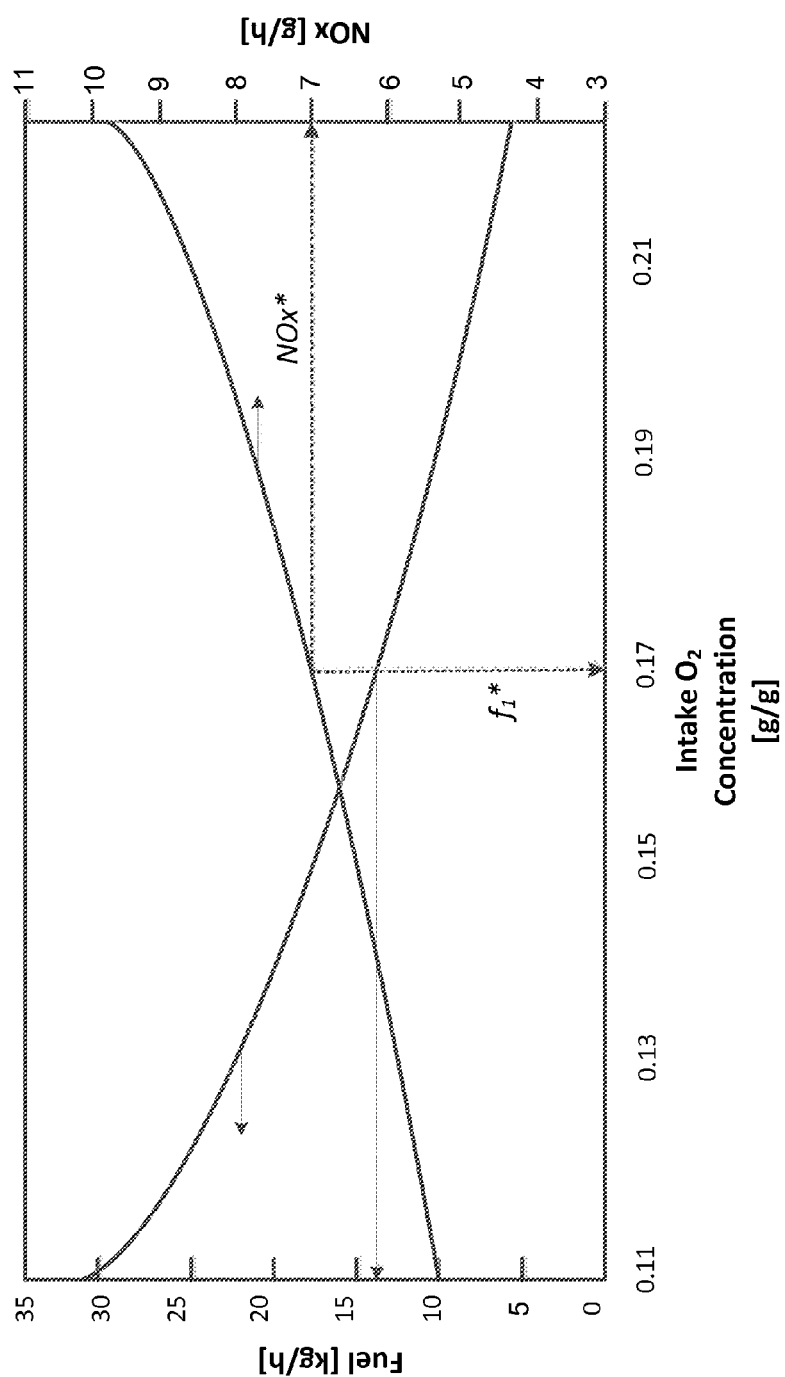
FIG. 1 illustrates the relationship between fuel consumption and NOx production at 2000 rpm, and 6 bar brake mean effective pressure (BMEP) in the cylinder.

Attention is therefore first directed to FIG. 1, wherein, for a given engine, one may within the context of the disclosure herein conveniently map the relationship of fuel consumption (kg/hour), NOx output (grams/hour) as a function of intake $O_2$ concentration (g/g) at a constant torque condition. It is first noted that chemists typically use molar-or volumebased description of concentration such as 0.209 liter of oxygen per liter of fresh air. In the present disclosure a mass-based description such as 0.231 gram of oxygen per gram of fresh air is employed. Mass-based descriptions are more suitable herein since the fresh airflow sensor provides values in kg/hour and the stoichiometric air/fuel ratio is usually in terms of kg of fuel per kg of fresh air. FIG. 1 is representative of passenger-class diesel engine operating at 2000 rpm and 6 bar brake mean effective pressure (BMEP) in the cylinder. It may be appreciated that such a graph can be also be readily prepared for a given engine at a number of engine speeds and other load conditions. The graph therefore identifies that intake oxygen (f1) is a factor that directly influences the amount of NOx produced at constant torque for a given fuel level.

Next is the recognition that for a given diesel engine the goal now is to minimize fuel consumption while remaining in NOx compliance. One may therefore now define SCR ammonia coverage "a" within the differential below:

$$\frac{da}{dt} = (\dot{m}_r - k * m_{\dot{N}Ox})/C$$

where $\dot{m}_r$ is the mass flow rate of reductant (e.g. ammonia), k is the amount of reductant necessary to react with one gram of NOx, the term $m_{\dot{N}Ox}$ is reference to the mass flow of NOx, and C is the ammonia storage capacity of the catalyst in grams. It is worth noting that the value of C can vary with temperature for a given SCR bed. By way of example only, C may have a value of 2-4 g/liter at 200° C. for a SCR bed that employs a zeolite type catalyst system.

Accordingly, from the above, one may initially determine the current SCR ammonia coverage "a" for a given engine. In such regard, "a" itself is the current normalized ammonia coverage of the catalyst and is defined as the current amount of reductant stored in the catalyst (grams) divided by "C", the reductant storage capacity of the catalyst (grams). Thus, "a" is a unit-less quantity.

$$a = \frac{\text{Amount of Reductant Stored in } SCR \text{ Catalyst}}{\text{Reductant Storage Capacity of } SCR \text{ Catalyst}}$$

Following the above, one may now determine a targeted NOx value, or NOx*, according to the following:

$$NO_x^* = f(a, T_{SCR}, N_E, T_E)$$

With attention back to FIG. 1, the desired NOx* can then be employed to determine a desired intake oxygen concentration f1* for a given engine speed and BMEP requirement. By way of example, a desired NOx of 7 g/h results in a $f_1^*$ of 0.17 along with the indication that the fuel consumption is set to about 14 kg/h.

As can be seen in the above relationship, the ability to achieve an target increase in NOx output (identified as NOx*) to improve engine efficiency (ability to operate at relatively lower fuel consumption and relatively higher intake oxygen concentration) may now be achieved with consideration and control of one or more of the following variables: (1) "a" the aforementioned variable of ammonia coverage, where shifting to a relatively higher value of "a" will allow for the ability to operate at a higher targeted NOx* output for treatment by a given SCR system.; (2) "$T_{SCR}$" the temperature of the SCR catalyst bed, which is identified as $T_{SCR}$, where for a given catalyst, one may now identify a temperature profile where, below a given temperature, or above a given temperature, the NOx output will decrease, and operation within a given temperature range will allow one to also achieve and operate at a targeted increase in NOx output or NOx*; (3) "$N_E$" engine speed, where an increase in engine speed will mean decrease in the NOx output or NOx*, as the space velocity of the exhaust will increase leading to reduced residence time in the SCR catalyst; and (4) "$T_E$" torque load, which may be determined, e.g., by the driver pedal command position. The torque load may either reduce or increase NOx output, and can be separately mapped for a given engine.

A target oxygen intake concentration $f_1^*$ may next be achieved according to consideration and control of the following variables:

$$f_1^* = f(NO_x^*, N_E, T_E, T_{IM}, T_W)$$

As can be seen in the above relationship, the target intake oxygen concentration $f_1^*$ can be achieved by regulation of one or more of the following variables: (1) "NOx*", the target NOx concentration described above, where the target intake oxygen will increase with increasing NOx*; (2) "$N_E$" engine speed, where the target intake oxygen will decrease with increasing engine speed; (3) "$T_{IM}$", the intake manifold temperature, wherein the target intake oxygen will decrease with an increase in intake manifold temperature; (4) "$T_W$" coolant (water) temperature, wherein the target intake oxygen will decrease with an increase in $T_W$; (5) "$T_E$" torque load, which may be determined by the driver pedal command position. The torque load may either reduce or increase f1* and can be mapped for a given engine.

In connection with the above variables, it should be noted that $\dot{m}_r$ can be readily measured at the intake location of the SCR catalyst bed where the mass flow of reductant is measured (e.g. with a urea flow sensor or calibrated command to the urea injector). The value of $\dot{m}_{NOx}$, which is the mass flow of NOx entering into the SCR catalyst bed, can be measured by a NOx sensor or estimated by a mathematical NOx model which considers the fuel quantity in the cylinder, oxygen concentration and engine speed. $T_{SCR}$ is the temperature of the SCR catalyst, which can be measured by placement of a thermocouple preferably in the middle of the catalyst bed and $T_E$ as alluded to above can be estimated by the driver pedal position. $T_{IM}$ is the intake manifold temperature and can be measured by placement of a thermistor within the intake manifold and $T_W$ is water coolant temperature, which can be measured by placement of thermistor at the input location of the water coolant into the engine.

In connection with the above objective of supplying a desired intake oxygen concentration, based upon the consideration and control of the indicated variables of NOx*, $N_E$, $T_E$, $T_{IM}$ and $T_W$, it is noted that such may be conveniently achieved by application of the air handling sliding mode control system that is described in U.S. Pat. No. 8,108,123, whose teachings are incorporated by reference. Such controller may therefore drive the engine to the desired intake oxygen concentration noted above by evaluation and control of the engine variables that influence the intake oxygen concentration. For example, the controller is such that it will consider variables such as the actual intake of oxygen ($f_1$), the pressure of oxygen in the intake ($p_1$), the pressure of oxygen in the exhaust ($p_3$) and the oxygen concentration in the exhaust ($f_3$). The controller then drives the engine to the desired intake oxygen concentration by, e.g., actuating the throttles and EGR valves such that the desired intake oxygen concentration is achieved. At such point the air handling controller will then be operating at some desired $p_1^*$, $p_3^*$ and $f_3^*$.

Meanwhile, one may also utilize control logic as described therein to set fuel injection parameters to match the current engine state. Eventually, the fuel level introduced to the engine will reduce as the actual intake oxygen nears the desired intake oxygen concentration and the matching fuel amount will then automatically be the expected and now reduced value. See again, U.S. Pat. No. 8,108,123.

Figure 2:
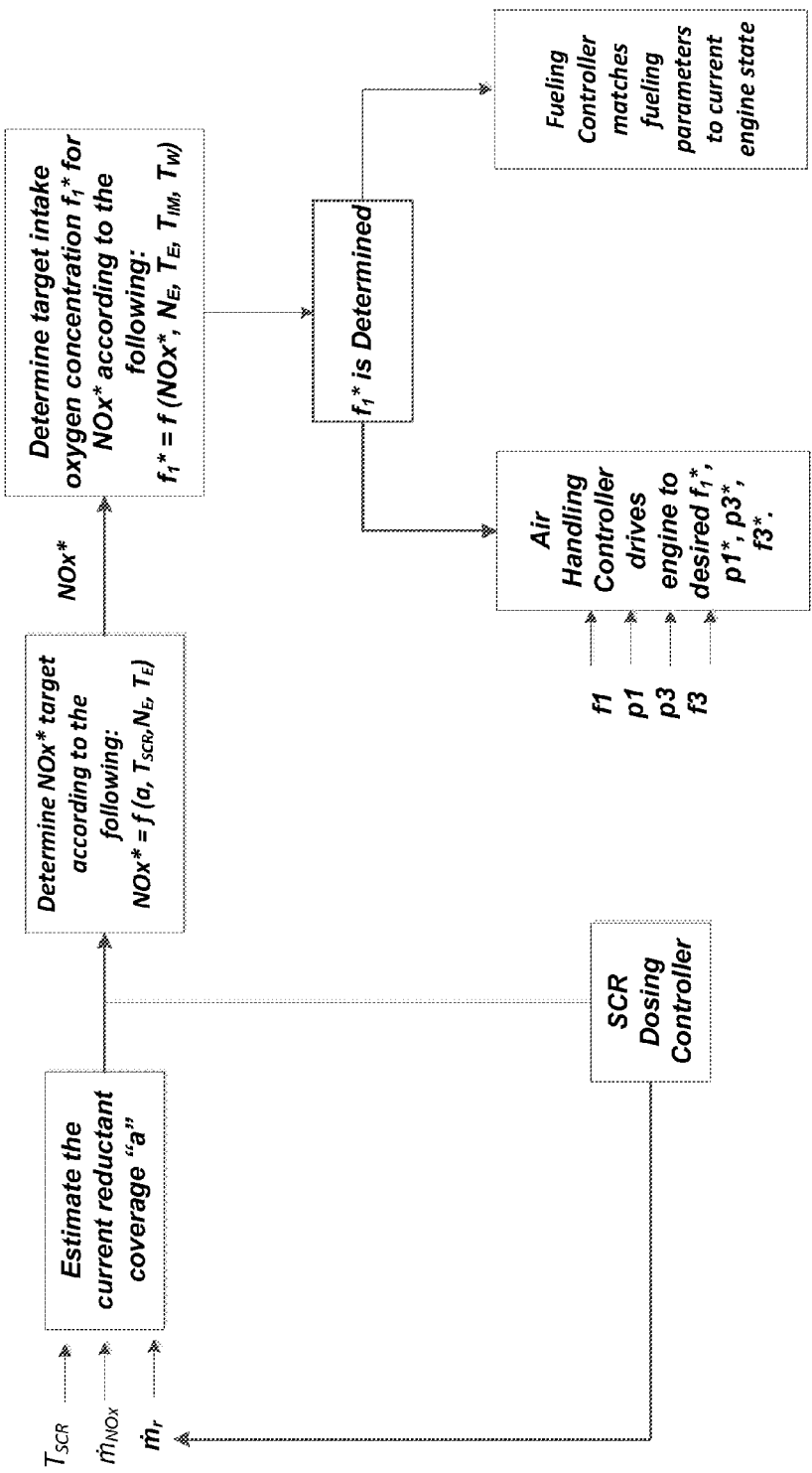
FIG. 2 illustrates in block diagram form the general method of coordinated control of the engine and the selective catalytic reduction system.

Attention is next directed to FIG. 2 which illustrates an example of the coordinated control of the engine and SCR system herein to allow the engine to produce relatively higher levels of NOx and operate at a relatively more efficient and lower fuel condition. As described in FIG. 2, one first identifies an engine operating at a given $T_{SCR}$, $\dot{m}_r$ (which is reference to the mass flow of reductant such as urea) and $\dot{m}_{NOx}$. Next, one may estimate the current reductant coverage "a". This may then be followed by determining a new NOx target level or NOx* based on the variables of: a, $T_{SCR}$, $N_E$ and $T_E$. As may be appreciated, by including "a" in this relationship one is now able to set a desired increase in NOx target output by increasing the amount of reductant that is stored in the SCR catalyst so that the SCR is operating at levels that it is fully capable of handling.

Once the NOx* target is determined, one may then determine, for a given engine, the target intake oxygen concentration ($f_1^*$) and for a given engine, identify the relationship between fuel consumption and NOx production as shown in FIG. 1. Once $f_1^*$ is identified for an identified value of NOx*, one can identify the variables in the engine that can be controlled in order to achieve $f_1^*$. As shown in FIG. 2, the value of $f_1^*$ will be a function of NOx* (the targeted NOx production), $N_E$ (engine speed), $T_E$ (torque load), $T_{IM}$ (intake manifold temperature), $T_W$ (coolant temperature). Then, the engine may be operated to achieve the desired value of $f_1^*$ by use of the indicated air handling controller and fueling controller.

As may be appreciated from the above, the target NOx* output is achieved in large measure by first identifying the current reductant coverage for a given SCR system, and then determining the targeted NOx output or NOx* based upon the appreciation that for a given SCR system, the value of a, the amount of reductant stored in the SCR catalyst divided by the reductant storage capacity of such catalyst, may be readily increased to treat the targeted NOx* output level that will be produced.

One may also recognize herein that a will have a value between 0 and 1. As a approaches 1, the SCR is reaching capacity with reductant and there is then a possibility of some reductant slip (passage of unreacted reductant). On the other hand, as a approaches the value of 0, the SCR will become devoid of reductant and there is a possibility of NOx slip (passage of NOx). Accordingly, one may select a target value of a as a trade-off between reductant slip and NOx slip. By way of example a* may have a value of 0.6.

As a refinement of the foregoing the following methodology may then be applied. As before, the urea dosing controller determines the reductant flow in order to drive the actual ammonia coverage a to a first target coverage $a^*_1$ (e.g. a fixed number such as 0.6). Unlike before though, the target NOx or NOx* is determined based on the difference between the actual ammonia coverage a and a separate (lower) target ammonia coverage $a^*_E$. By way of example $a^*$=0.67 and $a^*_E$=0.33. Now, the resulting system has two competing parts—the reductant (e.g. urea) dosing controller trying to push the actual ammonia coverage to 0.67 (by modulating the amount of injected urea amount) and simultaneously, the engine controller trying to push the actual ammonia coverage to 0.33 (by modulating production of NOx via control of f1).

Utilizing the above methodology, the system will then control the values of a as between $a^*_1$ and $a^*_E$. It may be appreciated that with respect to the selection of such values for operation, the system is one wherein the values achieved during engine operation may vary from such selected numbers by +/−10%. Accordingly, one may still achieve a relatively stable oscillating behavior of the actual ammonia coverage between some value just below 0.33 and some value just above 0.67. However, as long as the reductant dosing controller and engine controller are chosen appropriately, there will be no NOx or reductant slip.

As may now be appreciated, the methodology herein may be accomplished by a computer processing unit (CPU) configured to perform the methodology noted herein, and in particular, the respective routine indicated by the diagram in FIG. 2 for the coordinated control of the engine and selective catalytic reduction system. Accordingly, the CPU may store for a selected engine the relationship between fuel consumption and NOx output as a function of intake concentration for an engine that includes an SCR system and contains a SCR catalyst. The CPU determines for the SCR system associated with the selected engine, in combination with engine sensors, a current amount of reductant stored in the SCR catalyst and compares that to the known reductant storage capacity of the SCR catalyst. The CPU may then be configured to select a targeted level of NOx output for the engine (NOx*) wherein NOx* increases with increasing amount of reductant stored on the SCR catalyst. The CPU then selects a targeted intake oxygen concentration ($f_1^*$) for the selected engine to achieve the value of NOx*. The CPU then operates the engine at the value of $f_1^*$ and adjusts the engine fuel consumption for such value of $f_1^*$.

The CPU herein may also be configured to implement the disclosure herein by again first determining, in combination with engine sensors, a current amount of reductant stored in said SCR catalyst and the reductant storage capacity of the SCR catalyst, which is identified herein as the value of "a". This is then followed by inputting to the CPU a first targeted value or $a^*_1$ and a second and relatively lower targeted value $a^*_E$. The CPU may then modulate the amount of reductant injected to increase the value of a towards the value of $a^*_1$ while simultaneously modulating the production of NOx via control of intake oxygen concentration ($f_1$) to increase the value of a towards $a^*_E$.

The present subject matter may be embodied in other specific forms without departing from the general scope of the present invention. The identified embodiments are examples and illustrative and are not to be considered restrictive in nature.

The invention claimed is:

1. A method for controlling a selective catalytic reduction (SCR) system of an internal combustion engine and intake oxygen concentration comprising:
   identifying for a selected engine the relationship between fuel consumption and NOx output as a function of intake oxygen concentration ($f_1$), wherein said selected engine includes a SCR system containing a SCR catalyst;
   determining for the SCR system associated with said selected engine the current amount of reductant stored in said SCR catalyst and the reductant storage capacity of said SCR catalyst, wherein $$a = \frac{\text{Amount of Reductant Stored in SCR Catalyst}}{\text{Reductant Storage Capacity of SCR Catalyst}}$$

determining a targeted level of NOx output for said engine (NOx*), wherein said value of NOx* is achieved by increasing the value of a by increasing the amount of reductant stored on said SCR catalyst;

selecting a targeted intake oxygen concentration ($f_1^*$) for the selected engine to achieve said value of NOx*; and operating said engine at said value of $f_1^*$ and adjusting said engine fuel consumption for said value of $f_1^*$.

2. The method of claim 1 wherein said value of NOx* is achieved by adjustment of one or more of the following engine operating parameters:
   (a) temperature of the SCR catalyst ($T_{SCR}$)
   (b) engine speed ($N_E$)
   (c) torque load ($T_E$).

3. The method of claim 1 wherein said value of $f_1^*$ is achieved by adjustment of one or more of the following engine operating parameters:
   (a) engine speed ($N_E$)
   (b) intake manifold pressure ($T_{IM}$)
   (c) coolant temperature ($T_W$)
   (d) torque load ($T_E$).

4. The method of claim 1 wherein said value of $f_1^*$ is achieved by an engine air handling controller which adjusts one or more of the following:
   (a) engine intake oxygen concentration ($f_1$);
   (b) the pressure of oxygen in the intake ($p_1$);
   (c) the pressure of oxygen in the exhaust ($p_3$);
   (d) the oxygen concentration in the exhaust ($f_3$).

5. The method of claim 1 wherein said fuel consumption of said engine is adjusted by a fueling controller which adjusts the level of fuel introduced to said engine when said engine operates at said target intake oxygen concentration ($f_1^*$).

6. A method for controlling a selective catalytic reduction (SCR) system of an internal combustion engine and intake oxygen concentration comprising:

identifying for a selected engine the relationship between fuel consumption and NOx output as a function of intake oxygen concentration ($f_1$), wherein said selected engine includes a SCR system containing a SCR catalyst;

determining for the SCR system associated with said selected engine a current amount of reductant stored in said SCR catalyst and the reductant storage capacity of said SCR catalyst, wherein $$a = \frac{\text{Amount of Reductant Stored in SCR Catalyst}}{\text{Reductant Storage Capacity of SCR Catalyst}}$$

identifying a first targeted value for a identified as ($a^*_1$);
identifying a second and relatively lower targeted value for a as ($a^*_E$);
modulating the injected amount of reductant to increase the value of a towards ($a^*_1$); and
modulating the production of NOx by controlling the intake oxygen concentration to drive the value of a towards ($a^*_E$).

7. The method of claim 6 wherein said first targeted value ($a^*_1$) and said second and relatively lower targeted value ($a^*_E$) are selected such that there is no NOx slip and/or reductant slip.

8. A control device for a selective catalytic reduction (SCR) system of an internal combustion engine and intake oxygen concentration, the control device configured to:

identify for a selected engine the relationship between fuel consumption and NOx output as a function of intake oxygen concentration ($f_1$), wherein said selected engine includes a SCR system containing a SCR catalyst;

determine for the SCR system associated with said selected engine a current amount of reductant stored in said SCR catalyst and the reductant storage capacity of said SCR catalyst, wherein $$a = \frac{\text{Amount of Reductant Stored in SCR Catalyst}}{\text{Reductant Storage Capacity of SCR Catalyst}}$$

determine a targeted level of NOx output for said engine (NOx*), wherein said value of NOx* is achieved by increasing the value of a by increasing the amount of reductant stored on said SCR catalyst;

select a targeted intake oxygen concentration ($f_1^*$) for the selected engine to achieve said value of NOx*; and operate said engine at said value of $f_1^*$ and adjust said engine fuel consumption for said value of $f_1^*$.

9. A control device for a selective catalytic reduction (SCR) system of an internal combustion engine and intake oxygen concentration, the control device configured to:

identify for a selected engine the relationship between fuel consumption and NOx output as a function of intake oxygen concentration ($f_1$), wherein said selected engine includes a SCR system containing a SCR catalyst;

determine for the SCR system associated with said selected engine a current amount of reductant stored in said SCR catalyst and the reductant storage capacity of said SCR catalyst, wherein $$a = \frac{\text{Amount of Reductant Stored in SCR Catalyst}}{\text{Reductant Storage Capacity of SCR Catalyst}}$$

identify a first targeted value for a identified as ($a^*_1$);
identify a second and relatively lower targeted value for a as ($a^*_E$);
modulate the injected amount of reductant to increase the value of a towards ($a^*_1$); and
modulate the production of NOx by controlling the intake oxygen concentration to drive the value of a towards ($a^*_E$).

* * * * *